(12) United States Patent
Weppenaar et al.

(10) Patent No.: US 7,766,547 B2
(45) Date of Patent: Aug. 3, 2010

(54) OBJECT HAVING A LAYER OF CONDUCTING MATERIAL FORMING A SENSING DEVICE

(75) Inventors: Nicky Weppenaar, Augustenborg (DK); Ken Allan Mathiasen, Soenderborg (DK); Lars Pleth Nielsen, Lystrup (DK); Mads Kogsgaard Hansen, Aarhus N (DK)

(73) Assignee: Sauer-Danfoss Aps, Nordborg (DK)

( * ) Notice: Subject to any disclaimer, the term of this patent is extended or adjusted under 35 U.S.C. 154(b) by 302 days.

(21) Appl. No.: 11/784,034

(22) Filed: Apr. 5, 2007

(65) Prior Publication Data
US 2007/0234818 A1  Oct. 11, 2007

(30) Foreign Application Priority Data
Apr. 6, 2006  (DK) .............................. 2006 00493

(51) Int. Cl.
*G01K 1/08*  (2006.01)
*G01K 7/00*  (2006.01)
*G01K 13/00*  (2006.01)

(52) U.S. Cl. .................. 374/208; 374/163; 374/141; 374/183; 374/179; 374/16; 374/143; 374/46; 73/866.5; 73/73

(58) Field of Classification Search .............. 374/120, 374/121, 208, 100, 163, 183, 185, 179, 141, 374/142, 143, 144; 600/474, 549; 136/200; 73/866.5; 338/22 R, 25, 28
See application file for complete search history.

(56) References Cited

U.S. PATENT DOCUMENTS

| 2,600,029 | A |   | 6/1952  | Stone |
| 3,335,382 | A | * | 8/1967  | Forbes ..................... 338/22 R |
| 4,016,762 | A | * | 4/1977  | Payne ......................... 116/217 |
| 4,294,122 | A |   | 10/1981 | Couchman |
| 4,313,341 | A |   | 2/1982  | Yamaguchi et al. |
| 4,354,725 | A | * | 10/1982 | Herbaugh et al. ........... 439/736 |
| 4,419,652 | A |   | 12/1983 | Balmforth et al. ............. 338/28 |

(Continued)

FOREIGN PATENT DOCUMENTS

DE           19703932 A1    8/1998

(Continued)

OTHER PUBLICATIONS

European Search Report from corresponding European Application No. EP 07 10 5448 dated Jul. 2, 2007 (3 pages).

*Primary Examiner*—Gail Verbitsky
(74) *Attorney, Agent, or Firm*—McCormick, Paulding & Huber LLP

(57) ABSTRACT

An object comprising a body part having an electrically insulating outer surface part, and a first layer arranged on the outer surface part. The first layer is formed by one or more electrically conducting materials and defines one or more conducting paths between a first area of the outer surface part and a second area of the outer surface part. Thereby electrical signals may be transferred between the first and second area parts. The layer further defines a sensing device, which is thereby embedded into the object. The object is provided with a threaded portion defining an outer thread. Thereby the object may easily be fitted into an opening having a mating inner thread. The object may be in the form of an ordinary bolt with a sensing device embedded in a surface part thereof.

16 Claims, 3 Drawing Sheets

U.S. PATENT DOCUMENTS

| | | | |
|---|---|---|---|
| 4,495,810 A * | 1/1985 | Tessarzik et al. | 73/866.5 |
| 4,516,106 A * | 5/1985 | Nolting et al. | 338/28 |
| 4,548,780 A * | 10/1985 | Krohn | 264/272.15 |
| 4,575,705 A * | 3/1986 | Gotcher | 338/28 |
| 4,603,026 A * | 7/1986 | Martin | 264/272.18 |
| 4,603,455 A | 8/1986 | Woest et al. | |
| 4,749,415 A * | 6/1988 | Barton | 136/230 |
| 4,753,109 A | 6/1988 | Zabler | |
| 4,841,273 A * | 6/1989 | Horton | 338/28 |
| 4,904,091 A * | 2/1990 | Ward | 374/179 |
| 4,945,770 A | 8/1990 | Alvelid et al. | |
| 4,963,194 A * | 10/1990 | Mele | 136/221 |
| 4,991,976 A * | 2/1991 | Byles | 374/135 |
| 5,044,204 A | 9/1991 | Leighton | |
| 5,076,708 A * | 12/1991 | Pierson | 374/144 |
| 5,106,580 A * | 4/1992 | Mudiam | 422/53 |
| 5,176,053 A | 1/1993 | Alvelid et al. | |
| 5,176,450 A | 1/1993 | Loftus | |
| 5,203,278 A * | 4/1993 | Kinney | 116/218 |
| 5,380,092 A | 1/1995 | Alain | |
| 5,461,923 A | 10/1995 | Meisterling | |
| 5,573,335 A | 11/1996 | Schinazi | 374/141 |
| 5,594,405 A | 1/1997 | Kadlicko | |
| 5,642,717 A * | 7/1997 | Gilman et al. | 123/481 |
| 5,697,706 A * | 12/1997 | Ciaravino et al. | 374/166 |
| 5,900,135 A * | 5/1999 | Zitzmann | 205/717 |
| 5,945,665 A | 8/1999 | Hay | |
| 6,054,678 A * | 4/2000 | Miyazaki | 219/237 |
| 6,095,680 A * | 8/2000 | Baratta | 374/43 |
| 6,341,892 B1 * | 1/2002 | Schmermund | 374/185 |
| 6,964,518 B1 * | 11/2005 | Jagtøyen | 374/154 |
| 7,465,086 B1 * | 12/2008 | Foreman, Jr. | 374/143 |
| 2001/0023591 A1 | 9/2001 | Maeda et al. | |
| 2005/0094707 A1 * | 5/2005 | Lee et al. | 374/163 |
| 2005/0252299 A1 | 11/2005 | Oda | |
| 2006/0039446 A1 * | 2/2006 | Lee | 374/208 |
| 2008/0205478 A1 * | 8/2008 | Sasanuma et al. | 374/44 |

FOREIGN PATENT DOCUMENTS

| | | | |
|---|---|---|---|
| JP | 62211525 A | * | 9/1987 |
| JP | 06094543 A | * | 4/1994 |

* cited by examiner

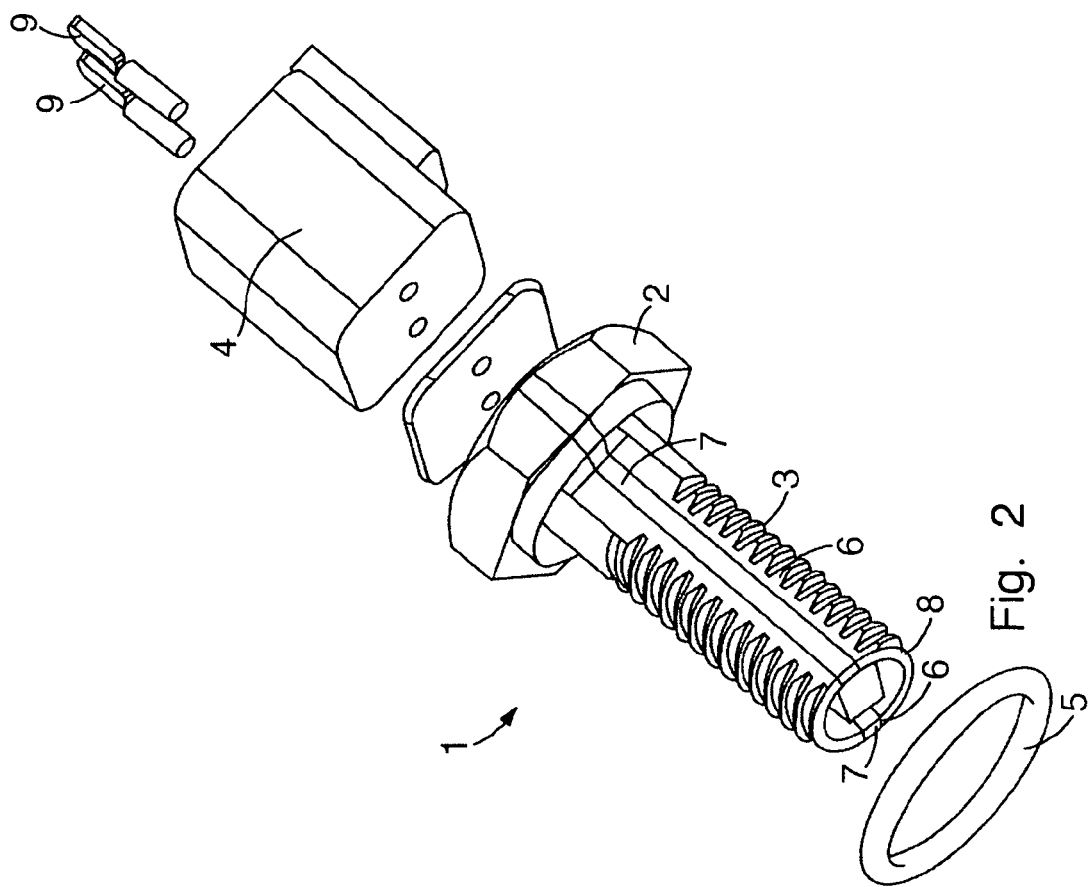
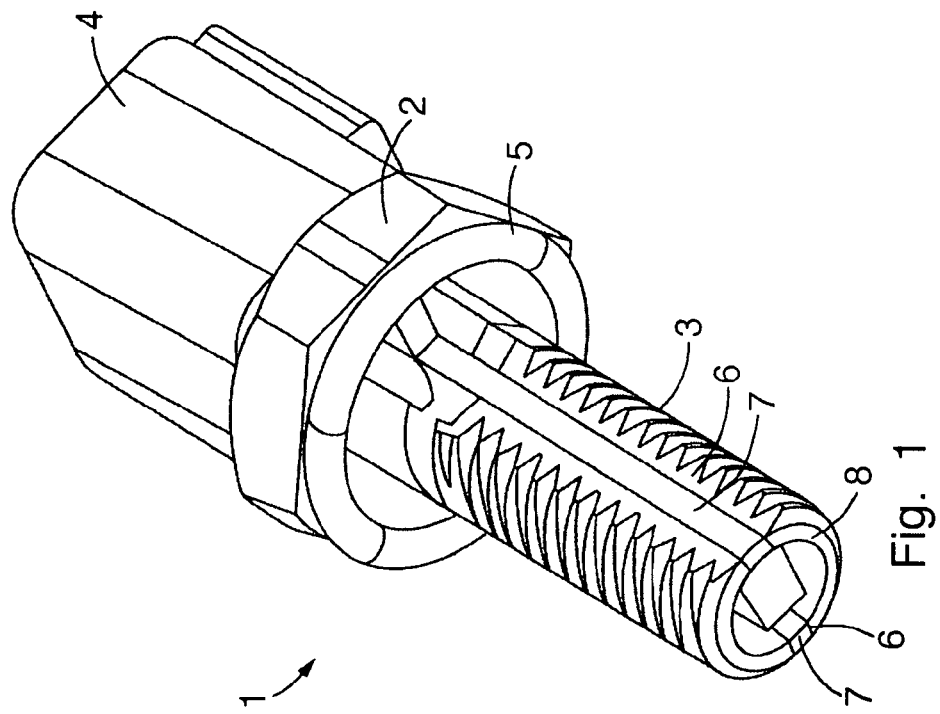

OBJECT HAVING A LAYER OF CONDUCTING MATERIAL FORMING A SENSING DEVICE

CROSS REFERENCE TO RELATED APPLICATIONS

Applicant hereby claims foreign priority benefits under U.S.C. §119 from Danish Patent Application No. PA 2006 00493 filed on Apr. 6, 2006, the contents of which are incorporated by reference herein.

FIELD OF THE INVENTION

The present invention relates to an object having a layer of electrically conducting material formed on an electrically insulating surface part, the electrically conducting layer forming a sensing device. Thereby the sensing device is embedded in the object. The object is provided with a threaded portion defining an outer thread, and is thereby adapted to be attached to another object being provided with a mating inner thread.

BACKGROUND OF THE INVENTION

It is often desirable to perform various measurements, such as temperature measurements, pressure measurements, strain measurements, moisture measurements, etc. at locations which are not readily accessible. Such locations may, e.g., be inside a motor or a closed container or vessel, e.g. a container/vessel containing hydraulic fluid, such as oil, or in a refrigeration system, including inside a compressor, or in a HVAC system, or in a reverse osmosis system, or in a furnace, e.g. in a burner component or in a boiler. It is therefore desirable to have a generic technique allowing for positioning of relevant sensing devices at these locations, and to be able to communicate with the sensing devices in order to retrieve the results of the measurements. This has turned out to be relatively difficult, partly because in some cases the sensing devices must be resistant to relatively hostile environments in terms of temperature, pressure, corrosion promoting substances, etc., partly because wires or the like for communicating signals to/from the sensing device must be lead through an outer wall surrounding the location of the relevant sensing device, which is difficult to do in a cost-effective and sufficiently sealed manner.

U.S. Pat. No. 4,419,652 discloses a temperature sensor having a thick or thin film forming a resistance temperature sensing element, a thermocouple or a resistance temperature device applied to the outer surface of one end of a dielectric, cylindrical support having a continuous circumferential protuberance about the middle portion thereof which can be engaged by a metal fixturing shell. The temperature sensor is associated with a pair of conductive leads extending the length of a substrate on which the temperature sensor is formed.

The temperature sensor of U.S. Pat. No. 4,419,652 can not readily be positioned at a desired location in a sufficiently sealed manner, since an engagement between the circumferential protuberance and a metal fixturing shell is needed in order to position the temperature sensor.

U.S. Pat. No. 5,573,335 discloses a thin film temperature sensing device for measuring the operating temperature of a cutting tool, e.g. a drill. The direct temperature sensing tool directly senses and provides feedback of the temperature of its cutting environment. The tool comprises a base body defining at least one cutting edge of the tool. A protective coating surrounds the base body and the cutting edge, the protective coating providing a friction-reducing surface for the tool. A thin film temperature sensing device, such as a thermocouple device, is disposed on the base body at a distance from the cutting edge. The temperature sensing device is encapsulated within the protective coating. An electrical connection is defined through the protective coating in electrical communication with the temperature sensing device. Thereby signals may be provided to/from the temperature sensing device.

Clearly, the device of U.S. Pat. No. 5,573,335 can not be readily positioned at a desired position in a sufficiently sealed manner.

SUMMARY OF THE INVENTION

It is, thus, an object of the invention to provide a sensing device which may easily be positioned in a location which is not readily accessible.

It is a further object to provide a sensing device which may form an integral part of a standard component.

It is an even further object of the invention to provide an object with a sensing device embedded therein.

It is an even further object of the invention to provide a sensing unit which can easily be retrofitted or adapted into an existing unit at a later stage.

According to the invention the above and other objects are fulfilled by providing an object comprising:

a body part having an electrically insulating outer surface part, a first layer arranged on the outer surface part, said first layer being formed by one or more electrically conducting materials, and defining one or more conducting paths between a first area of the outer surface part and a second area of the outer surface part, the layer further defining a sensing device, wherein the object is provided with a threaded portion defining an outer thread, the object thereby being adapted to be fitted into an opening being provided with a corresponding inner thread.

The first layer defines one or more conducting paths between a first area of the outer surface part and a second area of the outer surface part. Thereby signals may be transferred between the first part and the second part via the conducting path(s). Preferably, the sensing device is defined at or near the first (second) part, and the second (first) part is positioned outside a substantially closed volume, in which the sensing device is positioned. Thereby it is possible to transfer signals between a sensing device positioned inside such a substantially closed volume and equipment, such as processing equipment or data collecting equipment, positioned outside such a volume.

It is an advantage that the layer defines a sensing device. Thereby the sensing device is embedded within a surface of the object, i.e. it forms an integral part of the object. This is advantageous because the need for covering the sensing device by potting material is avoided, and thereby a wear resistant sensing device is provided without the known disadvantages relating to potting material.

The object is provided with a threaded portion defining an outer thread. Using this thread, the object may be screwed into another object being provided with a corresponding inner thread. Thereby it is very easy to fit the object with the sensing device into a suitable opening. Furthermore, providing the object with sealing means, e.g. an ordinary O-ring, a copper gasket, etc., makes it possible to fit the object at least substantially hermetically into the opening without compromising the possibility of communicating with the sensing device via the electrically conducting path(s). Finally, the object may be in the form of an ordinary bolt of standard size, but having the conducting path(s) and the sensing device applied thereto, e.g. by means of various coating techniques. Accordingly, the object may simply replace an ordinary bolt which is already present for fastening purposes. Thereby the sensing device does not take up additional space. Thus, it is very advantageous that the object is provided with a threaded portion. An additional advantage of using an ordinary bolt is that the object is not weakened as compared to the original bolt when the sensing device is applied. Accordingly, the object possesses the strength of the original bolt, and, furthermore, it may even be possible to fit the object hermetically into an opening as described above without additional sealing means.

The threaded portion may be arranged between the first area part and the second area part. In this case the electrically conducting path(s) is/are provided across the part of the object where the threaded portion is positioned. The electrically conducting path(s) may thus be provided across the outer thread.

Alternatively, the part of the object where the threaded portion is positioned may comprise one or more sub-portions where the thread is interrupted, said sub-portion(s) extending in a direction which is at least substantially parallel to the rotational axis of the thread. The sub-portion(s) define(s) one or more regions across the threaded region where the thread has been 'removed', i.e. one or more substantially smooth portions. The sub-portion(s) should be sufficiently large to provide a useful 'smooth' surface, thus enabling an at least substantially planar wiring section. On the other hand, the sub-portion(s) should be sufficiently small to ensure that the threaded portion may still function as a thread, i.e. it should still be possible to screw the object into an opening with a mating inner thread. The sub-portion(s) may, e.g., be formed by removing, e.g. by grinding, part of a substantially cylindrical threaded portion, which previously formed part of the thread. Alternatively, the sub-portion(s) may be formed by applying a thread to an edged object, e.g. an elongated object with a polygonal cross section. Thereby the thread will only be applied at and near the edges of the object, the straight portions thereby forming the sub-portions. The polygonal cross section may, e.g., be square, rectangular, hexagonal, octagonal, etc.

In a preferred embodiment the path(s) of the first layer may be arranged in the one or more sub-portions. This is very advantageous because it is much easier to provide a coating to a relatively smooth surface than to a threaded surface, because the thread defines 'hills' and 'valleys' of the surface. It is particularly difficult to apply a substantially continuous coating to such a surface. Since the first layer is supposed to define one or more conducting paths between the first area and the second area, it is important that the part(s) of the first layer defining this/these conducting path(s) is/are at least substantially continuous. It is therefore advantageous to arrange the path(s) in the sub-portion(s).

The body part may comprise a core part made from an electrically conducting material, and the outer surface part may be formed by a second layer of an electrically insulating material. In this case the second layer provides electrical insulation between the electrically conducting core part and the first layer which is also electrically conducting.

The second layer of electrically insulating material may at least substantially cover the core part. In this case the entire object may be covered by the second layer. Alternatively, only part of the object may be covered, such as the part carrying the threaded portion, or only areas corresponding to the position of the first layer. In the latter case the second layer may be applied in one or more relatively narrow bands, and the first layer may subsequently be applied on top of this/these band(s), in slightly narrower band(s) in order to ensure electrical insulation between the core part and the first layer.

The first layer may be formed by at least a first and a second electrically conducting material, and the path(s) may be formed in such a manner that a contact area is defined between a part of the path(s) being formed by the first electrically conducting material and a part of the path(s) being formed by the second electrically conducting material, said contact area defining a sensing device. The contact area may advantageously define a temperature sensor, preferably a thermocouple. Thereby a thermocouple embedded within an object, e.g. a bolt, has been provided. This is advantageous because such a thermocouple can easily be positioned inside a substantially closed volume, e.g. inside a motor, and online results of temperature measurements are easily communicated to the exterior of the closed volume via the conducting paths defined by the first layer.

In order to be in control of temperature measurements performed by means of a thermocouple, a bridge, such as a Wheatstone bridge, is sometimes connected to the wires forming the thermocouple. In accordance with the present invention, such a Wheatstone bridge may be embedded within the object similarly to the manner in which the sensing device is embedded within the object. Furthermore, by embedding the other resistors of the Wheatstone bridge in the sensing device, it would be possible to archive first order temperature compensation.

Alternatively, the object may further comprise a third layer of a deformable dielectric material, said third layer being arranged on the first layer in such a manner that the third layer at least substantially covers the first layer, and a fourth layer of an electrically conducting material being arranged on the third layer in such a way that one or more conducting paths between the first area of the outer surface part and the second area of the outer surface part is/are provided, the first layer, the third layer and the fourth layer thereby in combination forming a capacitor having a capacitance which is variable in response to deformation of the deformable material, said capacitor defining a sensing device.

The capacitor may advantageously define a pressure sensor operating in the following manner. When a pressure is applied to the deformable material, the distance between the first layer and the fourth layer is reduced. Since the first layer and the fourth layer define electrodes of the capacitor, the capacitance of the capacitor thereby changes as a function of the applied pressure. Accordingly, a measure for the pressure applied can be obtained by measuring the capacitance of the capacitor, or, alternatively, by measuring a change in the capacitance.

Alternatively, the first layer may comprise a first portion and a second portion, each comprising two or more fingers, and the first portion and the second portion may be arranged in such a manner that the fingers of the first portion and the fingers of the second portion form an interleaved pattern, said interleaved pattern defining a sensing device.

The interleaved pattern may define a strain gauge, preferably operating in the following manner. When the interleaved pattern is subject to strain, the distance between the fingers of the interleaved pattern will change. Thereby the conductivity between the fingers will also change. Thus, it is possible to obtain a measure for the strain applied to the object by measuring the conductivity between the fingers.

In case two mutually rotated interleaved patterns are embedded into the object, it is possible to obtain a sensing device which is capable of measuring axially resolved strain.

Alternatively, the interleaved pattern may define a moisture sensor. When the moisture in the volume surrounding the interleaved pattern is changed, the conductivity between the fingers will also change. Measuring the conductivity will thereby provide a measure for the moisture in the volume.

In general a chemical sensor ca be constructed which is not only sensing $H_2O$ but also CO, $CO_2$, $O_2$, $NH_3$, $H_2S$ and other species.

The object may further comprise a fifth layer of wear resistant and/or corrosion resistant material arranged on the object in such a manner that it covers at least the first layer. Such a wear resistant layer provides protection for the first layer, and possibly also for any other layer which may be present on the object. The wear resistant layer preferably covers at least the threaded portion of the object. Thereby the object may be screwed into a mating thread without risking that the first layer (and possibly any other layer) suffers damage. This ensures that the sensing device continues to operate appropriately, even if the object is positioned and removed several times.

The electrically conducting material(s) of the first layer may advantageously be selected from the group consisting of: Cr, NiCr, Ni, Cu, CuNi, Pt, PtIr, CrAlumel, Si, K, Ba, Ca, Na, Mg, Al, Mn, Zn, Fe, Sn, Pb, H, Hg, Ag, Au and/or any other suitable metal or alloy. These materials are known to be suitable for forming a thermocouple.

The object may further comprise at least one drive surface adapted to cooperate with a corresponding drive surface of a drive tool in driving the threaded portion into a mating inner threaded portion. The drive surface(s) may, e.g., be in the form of a slot adapted to receive an ordinary screwdriver, it may be the head of a bolt adapted to engage a spanner, or it may be any other suitable kind of drive surface(s). According to this embodiment, the object may advantageously be an ordinary bolt with the sensing device embedded therein. Thereby the object with the sensing device may easily be fitted into a corresponding opening with a mating inner thread. The very thin layer(s) applied to the object will not affect the dimensions of the object significantly, and the object may therefore still fit into standard threaded openings. This makes it very easy to position the sensing device, since it is only necessary to replace an ordinary bolt by a bolt having a relevant sensing device embedded therein.

The first layer may be arranged at least partly across at least one of the drive surface(s). This is particularly advantageous in case drive surfaces are arranged on a bolt head. In this case the first layer may advantageously continue along an outer surface of the object and along an outer surface of the bolt head to the top of the bolt head. Thereby a signal to/from a sensing device may be transferred from/to the top of the bolt head.

Within the scope of the present invention two or more sensing devices may be positioned on the same object. The sensing devices may be of the same kind, e.g. two or more temperature sensor. Alternatively, the sensing devices may be of different kind, e.g. a temperature sensor and a pressure sensor positioned on the same object, possibly in different parts of the surface area.

BRIEF DESCRIPTION OF THE DRAWINGS

The invention will now be described in further details with reference to the accompanying drawings in which FIG. 1 is a perspective view of an object according to an embodiment of the invention, FIG. 2 is an exploded view of the object of FIG. 1.

DETAILED DESCRIPTION OF THE INVENTION

Figure 3:
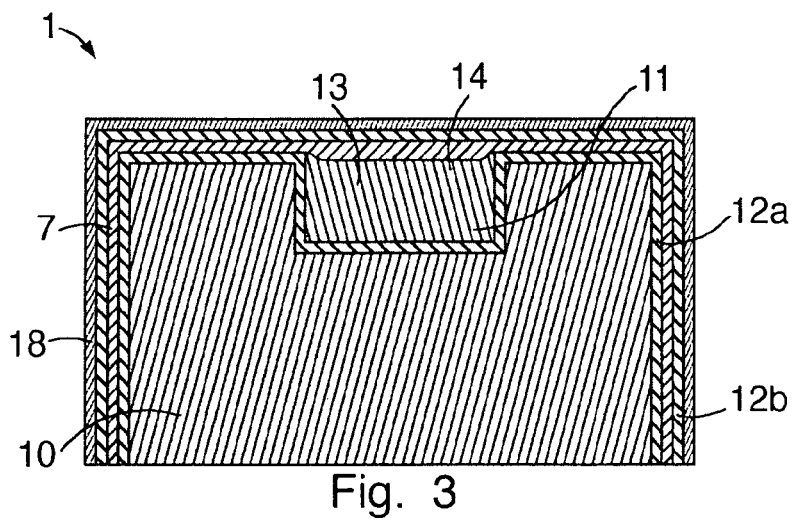
FIG. 3 is a cross sectional view of a part of an object according to an embodiment of the invention in which the sensing device is a strain gauge.

FIG. 1 is a perspective view of an object 1 in the form of a bolt. The object 1 is provided with a bolt head 2 adapted to engage a driving tool, such as a spanner, and a threaded portion 3. At the bolt head 2 the object 1 is connected to a connector box 4 for communicating signals from the object 1 to an external device. Also at the bolt head 2 is arranged an O-ring 5. Thereby the object 1 may be fitted tightly in an opening being provided with a mating inner thread.

The threaded portion 3 is provided with two sub-portions 6 where the thread is interrupted, i.e. there are no 'hills' and 'valleys' in the sub-portions 6, and the surface is therefore relatively smooth. The sub-portions 6 extend over the entire length of the threaded portion 3, thereby making it possible to establish an uninterrupted connection from one end of the threaded portion 3 to an opposite end of the threaded portion 3 along each of the sub-portions 6. Accordingly, a layer of electrically conducting material 7 is arranged along each of the sub-portions 6. Thereby the layer of electrically conducting material 7 establishes electrical connections between an end part 8 of the object 1 and the bolt head 2. Arranging the layer of electrically conducting material 7 along the sub-portions 6 has the advantage that a very thin layer may be applied without risking that the electrical connection is interrupted due to the 'hills' and 'valleys' formed by the threaded portion 3. A further advantage of arranging the layer of electrically conducting material 7 along the sub-portions 6 is that a relatively thick layer may be applied without risking that the thread is no longer able to fit into a mating inner thread of an opening. Such a relatively thick layer may, e.g., be used in case very weak signal are expected, or in case it is desired to transfer relatively high currents via the layer.

At the end part 8 of the object 1 the layer of electrically conductive material 7 forms a sensing device (not visible). Thus, the part of the layer of electrically conducting material 7 which is arranged along the sub-portions 6 establishes electrical connections between the sensing device and the connector box 4. Thereby it is possible to communicate with the sensing device when the object 1 is fixed in an opening with a mating inner thread.

FIG. 2 is an exploded view of the object 1 of FIG. 1. In FIG. 2 connector pins 9 for connecting the bolt head 2 to the connector box 4 have been superimposed. The connector pins 9 may be press fitted into corresponding holes in the bolt head 2, thereby establishing an electrical connection to the object 1.

FIG. 3 is a cross sectional view of a part of an object 1 according to an embodiment of the invention. The part shown in FIG. 3 may advantageously be positioned at the end part 8 of the object 1 shown in FIGS. 1 and 2. The object 1 comprises a core part 10 made from an electrically conducting material and provided with a recess 11. At least part of the outer surface of the core part 10 is provided with a layer of electrically insulating material 12a. In the recess 11 and on top of the layer of electrically insulating material 12a is arranged a resilient material 13. On top of the resilient material 13 and covering at least part of the outer surface of the object 1 is arranged a layer of electrically conducting material 7. In the area 14 corresponding to the position of the resilient material 13 the layer of electrically conducting material 7 forms a sensing device. On top of the electrically conducting material 7 is arranged a second layer of electrically insulating material 12b, and on top of this layer 12b is arranged a layer of wear resistant material 18 for protection of the layer of electrically conducting material 7, in particular the sensing device. In the embodiment shown in FIG. 3 the sensing device is a strain gauge operating in the following manner.

The layer of electrically conducting material 7 is arranged in a specific pattern in the area 14 corresponding to the position of the resilient material 13. This will be explained in further detail below with reference to FIGS. 4 and 5. When the object 1 is subjected to stress the resilient material 14 will be reversibly deformed. This will affect the pattern of the electrically conducting material 7 positioned in the area 14 in such a way that a change in the conductivity of the sensing device can be detected. This change in conductivity can be translated into a measure for the strain applied to the object 1, and the sensing device thereby functions as a strain gauge.

Figure 4:
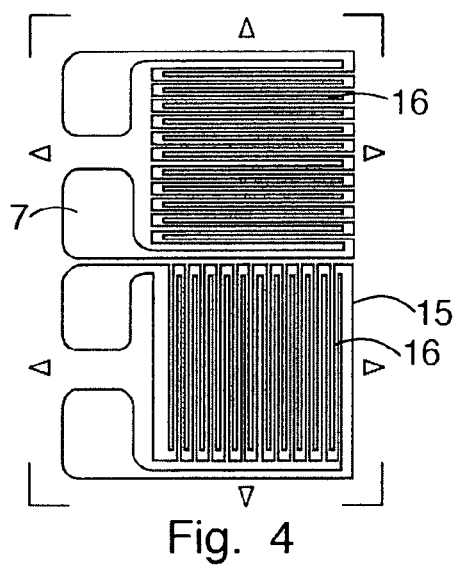
FIG. 4 illustrates a first pattern of electrically conducting material, the pattern forming a strain gauge.

FIG. 4 illustrates a first pattern of electrically conducting material 7. The pattern forms a sensing device 15 in the form of a strain gauge. The sensing device 15 comprises two meandering paths 16 arranged side-by-side in such a manner that the meandering patterns of the two paths 16 are arranged substantially perpendicularly with respect to each other. In case the sensing device 15 is stretched the distance between the longitudinal parts of the meandering pattern of one or both of the meandering paths 16 will increase, depending on the direction in which the sensing device 15 is stretched, as well as the amount of force applied to cause the stretching. This causes a change in the conductivity between the longitudinal parts of the meandering patterns of the sensing device 15. Thereby the sensing device 15 is capable of detecting a stress applied to the sensing device 15 as well as the direction in which the stress is applied.

Figure 5:
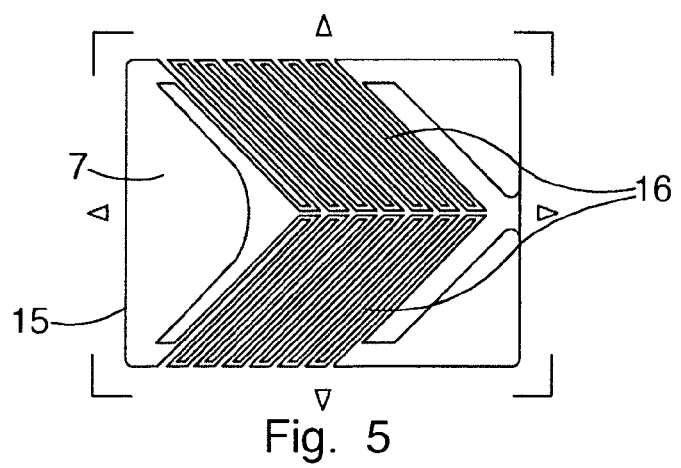
FIG. 5 illustrates a second pattern of electrically conducting material, the pattern forming a strain gauge.

FIG. 5 illustrates a second pattern of electrically conducting material 7. Also in this case the pattern forms a sensing device 15 in the form of a strain gauge. In FIG. 5 the meandering paths 16 are arranged in a wedge shaped pattern. However, the paths 16 are still arranged substantially perpendicularly to each other, and the sensing device 15 is therefore capable of detecting the size as well as the direction of a stress applied to the sensing device 15, similarly to what is described above with reference to FIG. 4.

Figure 6:
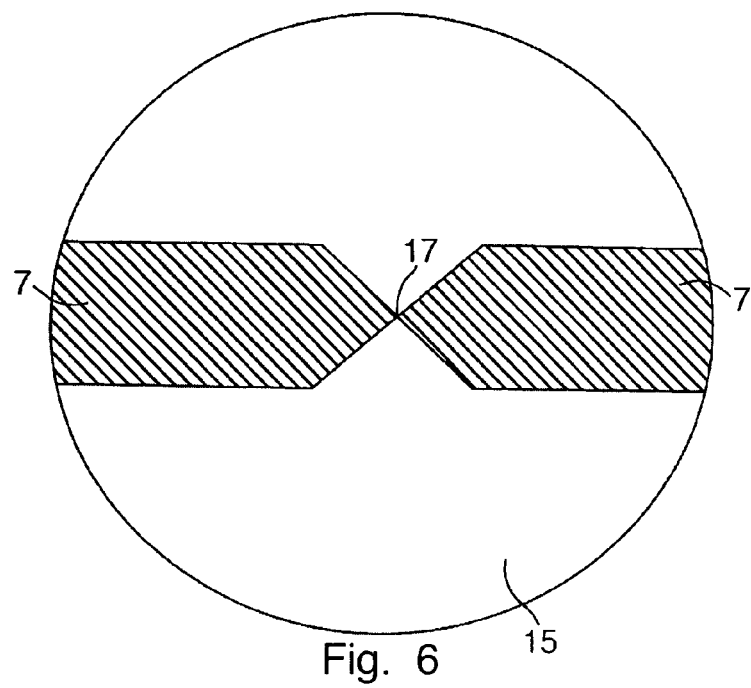
FIG. 6 illustrates a third pattern of electrically conducting material, the pattern forming a thermocouple.

FIG. 6 illustrates a third pattern of electrically conducting material 7. In this case the pattern forms a sensing device 15 in the form of a thermocouple. The pattern of electrically conducting material 7 is formed by two different electrically conducting materials. The two materials are arranged in such a manner that they define a contact point 17 where electrical connection is established between the two parts of the pattern of electrically conducting material 7. Thereby a junction between the two materials is formed. A similar junction may be formed in another position which is held at a substantially constant temperature level, or at least at a temperature which is known. When the sensing device 15, and thereby the contact point 17, is subjected to a change in temperature, the temperature difference between the two junctions will change correspondingly. Thereby an output voltage from the sensing device 15 is also changed due to the Peltier-Seebeck effect which is known per se. Accordingly, the sensing device 15 provides information of the temperature level at the position of the sensing device 15, and functions as a thermocouple.

As an alternative, the contact point 17 may be provided by a larger overlap between the patterns of electrically conducting material 7. In this case the tapered portions of the patterns 7 may be absent, and the two patterns 7 may simply overlap in a certain area of square or rectangular shape. The advantage of such a design is that contact between the two parts of the patterns of electrically conducting material 7 is ensured. However, the point where the temperature is measured will be less well-defined as compared to the embodiment shown in FIG. 6.

Figure 7:
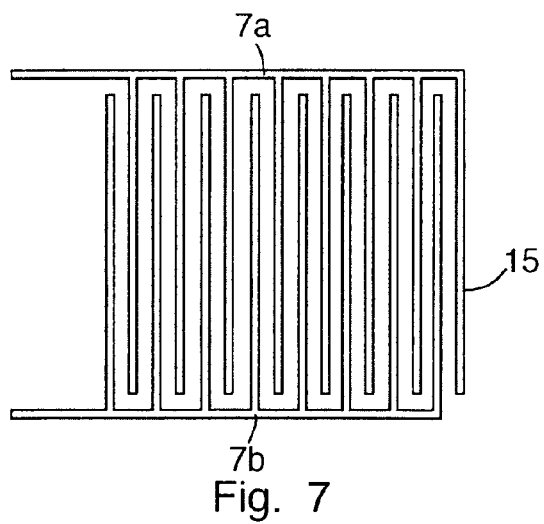
FIG. 7 illustrates a fourth pattern of electrically conducting material, the pattern forming a moisture sensor.

FIG. 7 illustrates a fourth pattern of electrically conducting material 7. The pattern forms two separate conducting paths 7a, 7b which are arranged in an interleaved manner. The pattern forms a sensing device 15 in the form of a moisture sensor. The sensing device 15 operates in the following manner. When the sensing device 15 is subjected to a change in moisture level of the ambient air, the conductivity between the fingers of the interleaved pattern changes accordingly, and measuring this change in conductivity will thereby provide a measure for the moisture level of the ambient air, or other chemical species in cases where the substrate interacts with chemical species which may alter the conductivity between the conductors.

Figure 8:
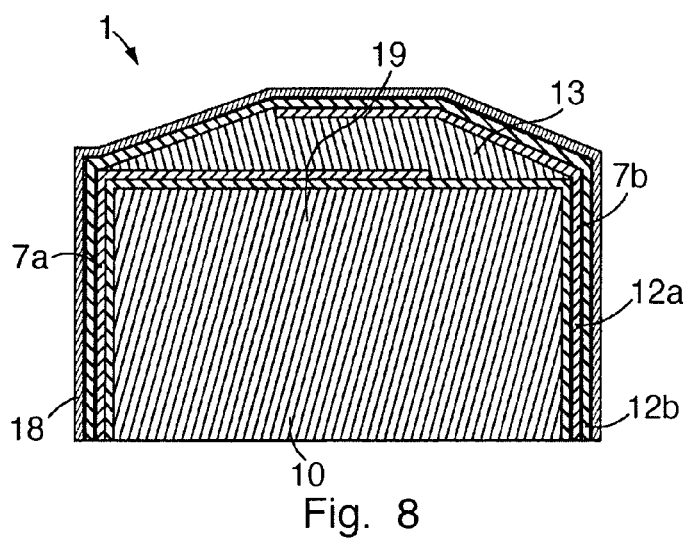
FIG. 8 is a cross sectional view of a part of an object according to an embodiment of the invention in which the sensing device is a pressure sensor.

FIG. 8 is a cross sectional view of a part of an object 1 according to an embodiment of the invention. The part shown in FIG. 8 may advantageously be positioned at the end part 8 of the object shown in FIGS. 1 and 2. The object 1 comprises a core part 10 made from an electrically conducting material. At least part of the outer surface of the core part 10 is provided with a layer of electrically insulating material 12a. On top of the layer of insulating material 12a is arranged a layer of electrically conducting material 7. The layer of electrically conducting material 7 comprises two parts 7a, 7b. At an end region 19 of the object 1 the first part 7a and the second part 7b of the layer of electrically conducting material 7 are overlapping and spaced apart. Between the parts 7a, 7b a resilient material 13 is arranged. On top of the layer of electrically conducting material 7 is arranged a second layer of electrically insulating material 12b, and on top of this layer 12b is arranged a layer of wear resistant material 18. In the embodiment shown in FIG. 8 a pressure sensor is defined by the layer of electrically conducting material 7. The pressure sensor operates in the following manner.

The two parts 7a, 7b of the layer of electrically conducting material 7 form a capacitor in region 19. When the object 1 is subjected to a pressure, the resilient material 13 will be reversibly deformed, thereby changing the distance between the two parts 7a, 7b. Accordingly, the capacitance of the capacitor formed by the two parts 7a, 7b is changed. By measuring the change in capacitance, a measure for the applied pressure can be obtained. Thereby the layer of electrically conducting material 7 forms a sensing device in form of a pressure sensor.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An object comprising:
a body part having an electrically insulating outer surface part; and
a first layer arranged on the outer surface part, said first layer being formed by one or more electrically conducting materials, and defining one or more conducting paths arranged on the outer surface part between a first area of the outer surface part and a second area of the outer surface part, the layer further defining a sensing device,
wherein the object is provided with a threaded portion arranged between the first area and the second area and defining an outer thread, the object thereby being adapted to be fitted into an opening provided with a corresponding inner thread.

2. The object according to claim 1, wherein the part of the object where the threaded portion is positioned comprises one or more sub-portions where the thread is interrupted, said sub-portion(s) extending in a direction which is at least substantially parallel to the rotational axis of the thread.

3. The object according to claim 2, wherein the path(s) of the first layer is/are arranged in the one or more sub-portions.

4. The object according to claim 1, wherein the body part comprises a core part made from an electrically conducting material, and wherein the outer surface part is formed by a layer of an electrically insulating material.

5. The object according to claim 4, wherein the layer of electrically insulating material at least substantially covers the core part.

6. The object according to claim 1, wherein the first layer is formed by at least a first and a second electrically conducting material, and wherein the path(s) is/are formed in such a manner that a contact area is defined between a part of the path(s) being formed by the first electrically conducting material and a part of the path(s) being formed by the second electrically conducting material, said contact area defining a sensing device.

7. The object according to claim 6, wherein the contact area defines a temperature sensor.

8. The object according to claim 1, further comprising a third layer of a deformable dielectric material, said third layer being arranged on the first layer in such a manner that the third layer at least substantially covers the first layer, and a fourth layer of an electrically conducting material being arranged on the third layer in such a way that one or more conducting paths between the first area of the outer surface part and the second area of the outer surface part is/are provided, the first layer, the third layer and the fourth layer thereby in combination forming a capacitor having a capacitance which is variable in response to deformation of the deformable material, said capacitor defining a sensing device.

9. The object according to claim 8, wherein the capacitor defines a pressure sensor.

10. The object according to claim 1, wherein the electrically conducting material(s) of the first layer is/are selected from the group consisting of: Cr, NiCr, Ni, Cu, CuNi, Pt, PtIr, CrAlumel, Si, K, Ba, Ca, Na, Mg, Al, Mn, Zn, Fe, Sn, Pb, H, Hg, Ag, Au.

11. The object according to claim 1, further comprising at least one drive surface adapted to cooperate with a corresponding drive surface of a drive tool in driving the threaded portion into a mating inner threaded portion.

12. The object according to claim 11, wherein the first layer is arranged at least partly across at least one of the drive surface(s).

13. The object according to claim 1, further comprising a layer of wear resistant material arranged on the object in such a manner that it covers at least the first layer.

14. An object comprising:
a body part having an electrically insulating outer surface part; and
a first layer arranged on the outer surface part, said first layer being formed by one or more electrically conducting materials, and defining one or more conducting paths arranged on the outer surface part between a first area of the outer surface part and a second area of the outer surface part, the layer further defining a sensing device,
wherein the object is provided with a threaded portion arranged between the first area and the second area and defining an outer thread, the object thereby being adapted to be fitted into an opening provided with a corresponding inner thread; and
wherein the first layer comprises a first portion and a second portion, each comprising two or more fingers, and wherein the first portion and the second portion are arranged in such a manner that the fingers of the first portion and the fingers of the second portion form an interleaved pattern, said interleaved pattern defining a sensing device.

15. The object according to claim 14, wherein the interleaved pattern defines a strain gauge.

16. The object according to claim 14, wherein the interleaved pattern defines a moisture sensor.

* * * * *